US009382844B2

(12) United States Patent
Muldoon et al.

(10) Patent No.: US 9,382,844 B2
(45) Date of Patent: Jul. 5, 2016

(54) MID-TURBINE FRAME BUFFER SYSTEM

(71) Applicant: United Technologies Corporation, Hartford, CT (US)

(72) Inventors: Marc J. Muldoon, Marlborough, CT (US); Gregory E. Reinhardt, South Glastonbury, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 503 days.

(21) Appl. No.: 13/879,471

(22) PCT Filed: Jan. 7, 2013

(86) PCT No.: PCT/US2013/020466
§ 371 (c)(1),
(2) Date: Apr. 15, 2013

(87) PCT Pub. No.: WO2013/147969
PCT Pub. Date: Oct. 3, 2013

(65) Prior Publication Data
US 2014/0075951 A1 Mar. 20, 2014

Related U.S. Application Data

(63) Continuation of application No. 13/362,361, filed on Jan. 31, 2012, now Pat. No. 8,366,382.

(51) Int. Cl.
F02C 7/28 (2006.01)
F02C 7/20 (2006.01)
(Continued)

(52) U.S. Cl.
CPC . F02C 7/20 (2013.01); F01D 11/02 (2013.01); F01D 11/04 (2013.01); F01D 25/16 (2013.01);
(Continued)

(58) Field of Classification Search
CPC ............... F02C 7/20; F02C 7/28; F02C 6/08; F01D 11/02; F01D 11/04; F01D 25/16; F01D 25/183; F01D 25/20; F01D 25/28; F02K 3/06; F05D 2240/56; F05D 2260/98; F05D 2300/224
USPC ........... 60/782, 785, 796, 797, 795, 805, 806, 60/39.08; 415/111, 170.1, 229
See application file for complete search history.

(56) References Cited

U.S. PATENT DOCUMENTS 3,287,906 A 11/1966 McCormick
3,527,054 A 9/1970 Hemsworth
(Continued)

FOREIGN PATENT DOCUMENTS

EP 1873357 1/2008
FR 1086521 2/1955
(Continued)

OTHER PUBLICATIONS

Gunston, Bill, "Jane's Aero-Engines," Issue Seven, 2000, pp. 510-512.
(Continued)

Primary Examiner — Steven Sutherland
(74) Attorney, Agent, or Firm — Carlson, Gaskey & Olds, P.C.

(57) ABSTRACT

A mid-turbine frame buffer system for a gas turbine engine includes a mid-turbine frame that supports a shaft by a bearing. An air compartment and a bearing compartment are arranged radially inward of the mid-turbine frame. The bearing compartment is arranged within the air compartment and includes first and second contact seals arranged on either side of the bearing. The air compartment includes multiple air seals. A high pressure compressor is fluidly connected to the air compartment and is configured to provide high pressure air to the air compartment. A method of providing pressurized air to a buffer system includes sealing a bearing compartment with contact seals, surrounding the bearing compartment with an air compartment, and supplying high pressure air to the air compartment.

10 Claims, 2 Drawing Sheets

(51) Int. Cl.
*F01D 11/02* (2006.01)
*F01D 25/16* (2006.01)
*F01D 25/28* (2006.01)
*F16J 15/40* (2006.01)
*F01D 11/04* (2006.01)
*F01D 25/18* (2006.01)
*F01D 25/20* (2006.01)
*F02K 3/06* (2006.01)
*F02C 6/08* (2006.01)

(52) U.S. Cl.
CPC .............. *F01D 25/183* (2013.01); *F01D 25/20* (2013.01); *F01D 25/28* (2013.01); *F02C 6/08* (2013.01); *F02C 7/28* (2013.01); *F02K 3/06* (2013.01); *F16J 15/40* (2013.01); *F05D 2240/56* (2013.01); *F05D 2260/98* (2013.01); *F05D 2300/224* (2013.01)

(56) References Cited

U.S. PATENT DOCUMENTS

| | | | |
|---|---|---|---|
| 3,747,343 | A | 7/1973 | Rosen |
| 4,574,584 | A * | 3/1986 | Hovan ................ F01D 25/125 184/6.11 |
| 4,645,415 | A * | 2/1987 | Hovan ................ F01D 25/125 415/115 |
| 4,653,267 | A | 3/1987 | Brodell et al. |
| 4,709,545 | A * | 12/1987 | Stevens ................ F01D 11/00 60/39.08 |
| 5,160,251 | A | 11/1992 | Ciokajlo |
| 5,915,917 | A | 6/1999 | Eveker et al. |
| 6,131,910 | A | 10/2000 | Bagepalli et al. |
| 7,001,075 | B2 * | 2/2006 | Bradshaw ............... F01D 9/065 384/134 |
| 7,426,834 | B2 | 9/2008 | Granitz et al. |
| 7,694,505 | B2 | 4/2010 | Schilling |
| 2003/0097844 | A1 | 5/2003 | Seda |
| 2005/0235651 | A1* | 10/2005 | Morris ................ F01D 25/125 60/782 |
| 2006/0042223 | A1* | 3/2006 | Walker .................... F01D 9/065 60/39.08 |
| 2008/0022692 | A1* | 1/2008 | Nagendra ............. F01D 25/162 60/796 |
| 2008/0134657 | A1* | 6/2008 | DiBenedetto ........... F01D 9/065 60/39.08 |
| 2010/0148396 | A1 | 6/2010 | Xie et al. |
| 2010/0236216 | A1 | 9/2010 | Winter et al. |
| 2010/0331139 | A1 | 12/2010 | McCune |
| 2011/0079019 | A1 | 4/2011 | Durocher et al. |
| 2011/0203293 | A1 | 8/2011 | Glahn |

FOREIGN PATENT DOCUMENTS

| | | |
|---|---|---|
| GB | 1516041 | 6/1978 |
| GB | 2041090 | 9/1980 |
| WO | 2007038674 | 4/2007 |

OTHER PUBLICATIONS

International Preliminary Report on Patentability for Application No. PCT/US13/020466. Date of Issuance Aug. 5, 2014.
PCT International Search Report for Application No. PCY/US13/20466 mailing date Sep. 30, 2013.
Extended European Search Report for European Application No. 13769508.6 mailed Nov. 11, 2015.
Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida.
Agarwal, B.D. and Broutman, L.J. (1990). Analysis and performance of fiber composites, 2nd Edition. John Wiley & Sons, Inc. New York: New York.
Carney, K., Pereira, M. Revilock, and Matheny, P. Jet engine fan blade containment using two alternate geometries. 4th European LS-DYNA Users Conference.
Brines, G.L. (1990). The turbofan of tomorrow. Mechanical Engineering: The Journal of the American Society of Mechanical Engineers, 108(8), 65-67.
Faghri, A. (1995). Heat pipe and science technology. Washington, D.C.: Taylor & Francis.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www. mmsonline.com/articles/composite-fan-blade-containment-case.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979.
Horikoshi, S. and Serpone, N. (2013). Introduction to nanoparticles. Microwaves in nanoparticle synthesis. Wiley-VCH Verlag GmbH & Co. KGaA.
Kerrebrock, J.L. (1977). Aircraft engines and gas turbines. Cambridge, MA: The MIT Press.
Xie, M. (2008). Intelligent engine systems: Smart case system. NASA/CR-2008-215233.
Knip, Jr., G. (1987). Analysis of an advanced technology subsonic turbofan incorporating revolutionary materials. NASA Technical Memorandum. May 1987.
Willis, W.S. (1979). Quiet clean short-haul experimental engine (QCSEE) final report. NASA/CR-159473.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press.
Ramsden, J.M. (Ed). (1978). The new European airliner. Flight International, 113(3590). Jan. 7, 1978.
Langston, L. and Faghri, A. Heat pipe turbine vane cooling. Prepared for Advanced Turbine Systems Annual Program Review. Morgantown, West Virginia. Oct. 17-19, 1995.
Oates, G.C. (Ed). (1989). Aircraft propulsion systems and technology and design. Washington, D.C.: American Institute of Aeronautics, Inc.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc.
Pyrograf-III Carbon Nanofiber. Product guide. Retrieved from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc.
Ratna, D. (2009). Handbook of thermoset resins. Shawbury, UK: iSmithers.

(56) References Cited

OTHER PUBLICATIONS

Wendus, B.E., Stark, D.F., Holler, R.P., and Funkhouser, M.E. (2003). Follow-on technology requirement study for advanced subsonic transport.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

\* cited by examiner

MID-TURBINE FRAME BUFFER SYSTEM

BACKGROUND

This disclosure relates to a mid-turbine frame buffer system for a gas turbine engine.

A mid-turbine frame is a structural case that is used to support the aft end of the high spool shaft of a turbofan engine. The mid-turbine frame is located between the high pressure turbine and low pressure turbine, a location where the core flowpath pressure and temperature are high. The static mid-turbine frame supports a rotating high speed shaft through a bearing enclosed in a buffered bearing compartment. Since the bearing must be cooled and lubricated with a constant oil flow, seals are used to contain the oil at static-to-rotating interfaces. The buffer air pressure outside of the bearing compartment must remain higher than the pressure inside the compartment so that air always leaks into the compartment, not out, so that the oil is contained within the bearing compartment.

SUMMARY

A mid-turbine frame buffer system for a gas turbine engine includes a mid-turbine frame that supports a shaft by a bearing. An air compartment and a bearing compartment are arranged radially inward of the mid-turbine frame. The bearing compartment is arranged within the air compartment and includes a seal assembly provided adjacent the bearing. The air compartment includes two or more air seals. An air source is fluidly connected to the air compartment and is configured to provide pressurized air to the air compartment.

In a further embodiment of the above, the bearing may be a roller bearing.

In a further embodiment of any of the above, the mid-turbine frame may be arranged axially between the high and low pressure turbines.

In a further embodiment of any of the above, the air source may be a high pressure compressor. Further, the high pressure compressor and the high pressure turbine may be supported on the shaft.

In a further embodiment of any of the above, a lubrication pump may be fluidly connected to the bearing compartment by a scavenge line.

In a further embodiment of any of the above, the seal assembly may include first and second contact seals. Further, each of the first and second contact seals may have first and second members in engagement with one another. At least one of the first and second members may be constructed from a carbon material.

In a further embodiment of any of the above, the air seals may include a labyrinth seal.

In a further embodiment of any of the above, the air seals may include a brush seal.

In a further embodiment of any of the above, the mid-turbine frame may include a member arranged in a core flow path. The member may provide a passage fluidly connecting mid-turbine frame outer and inner areas to one another for delivering the pressurized air to the air compartment.

A method of providing pressurized air to a buffer system includes sealing a bearing compartment with two or more seals, surrounding the bearing compartment with an air compartment, and supplying pressurized air to the air compartment.

In a further embodiment of the above, the two or more seals may be contact seals that may include a carbon material.

In a further embodiment of any of the above, the two or more seals may include contact seals and two or more air seals. Further, at least one of the two or more air seals may be at least one of a labyrinth seal and a brush seal.

In a further embodiment of any of the above, the pressurized air may include high pressure compressor air.

In a further embodiment of any of the above, the bearing compartment may be provided between low and high pressure turbines.

Another embodiment address a gas turbine engine that includes, among other possible things, a fan; a compressor section fluidly connected to the fan; a combustor fluidly connected to the compressor section; a turbine section fluidly connected to the combustor, the turbine section including a high pressure turbine coupled to the high pressure compressor via a shaft; a low pressure turbine; and a mid-turbine frame positioned between the high pressure turbine and the low pressure turbine, the mid-turbine frame supporting the shaft by a bearing; and a mid-turbine frame buffer system that includes an air compartment; and a bearing compartment arranged radially inward of the mid-turbine frame, the bearing compartment arranged within the air compartment, the bearing compartment including a seal assembly provided adjacent the bearing, the air compartment including two or more air seals. The compressor is fluidly connected to the air compartment and is configured to provide pressurized air to the air compartment.

In a further embodiment of the foregoing as turbine engine, the bearing may be a roller bearing.

In another further embodiment of any of the foregoing gas turbine engine embodiments, the engine may further include a lubrication pump fluidly connected to the bearing compartment by a scavenge line.

In another further embodiment of any of the foregoing gas turbine engine embodiments, the seal assembly may include first and second contact seals. Further, each of the first and second contact seals may have first and second members in engagement with one another. In addition, at least one of the first and second members may be constructed from a carbon material.

In another further embodiment of any of the foregoing gas turbine engine embodiments, the air seals may include at least one of a labyrinth seal and a brush seal.

In another further embodiment of any of the foregoing gas turbine engine embodiments, the gas turbine engine may be a high bypass geared aircraft engine having a bypass ratio of greater than about six (6).

In another further embodiment of any of the foregoing gas turbine engine embodiments, the gas turbine engine may include a low Fan Pressure Ratio of less than about 1.45.

In another further embodiment of any of the foregoing gas turbine engine embodiments, the low pressure turbine may have a pressure ratio that is greater than about 5.

BRIEF DESCRIPTION OF THE DRAWINGS

The disclosure can be further understood by reference to the following detailed description when considered in connection with the accompanying drawings wherein.

DETAILED DESCRIPTION

Figure 1:
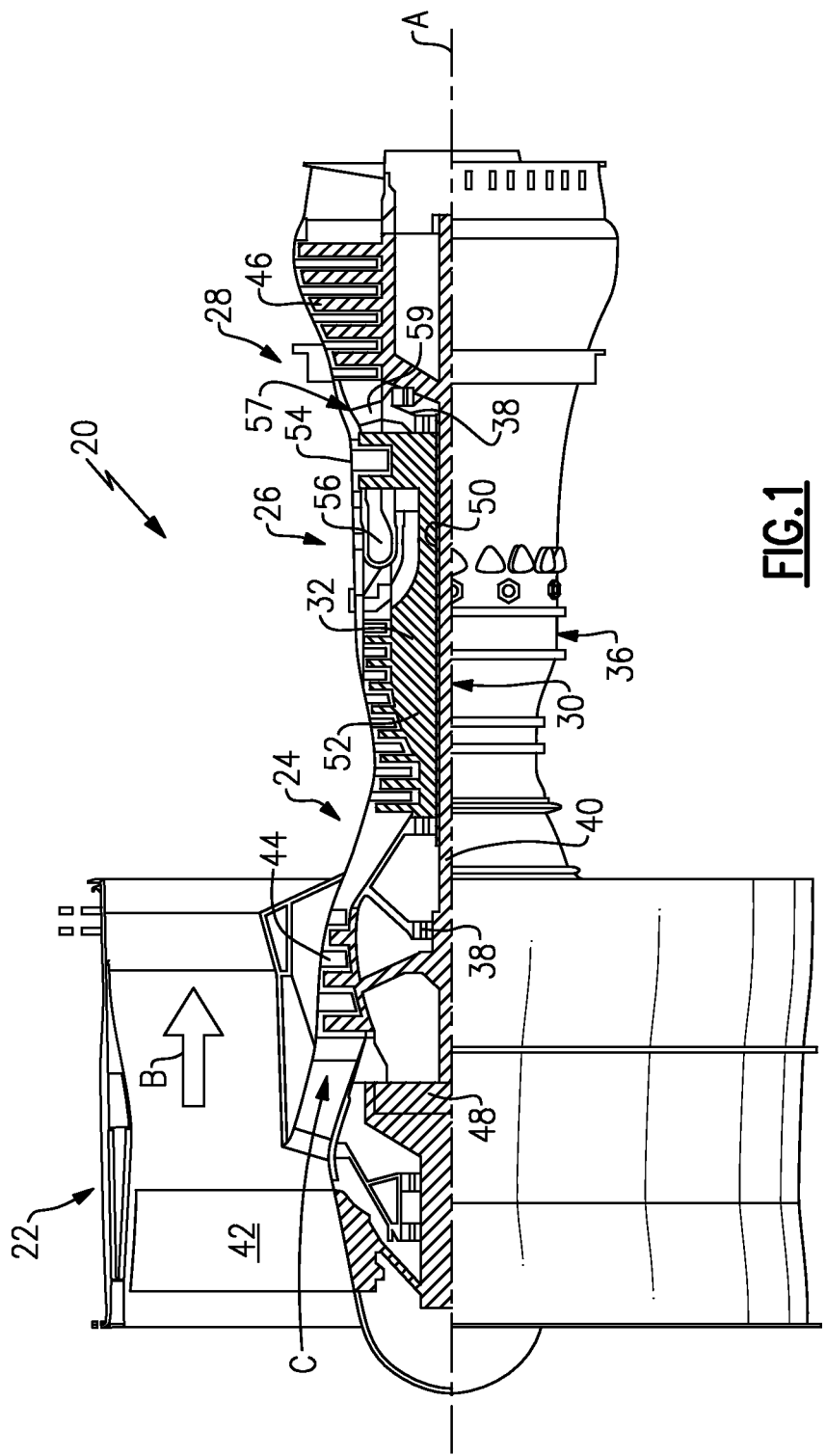
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as bucket cruise Thrust Specific Fuel Consumption ("TSFC"). TSFC is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
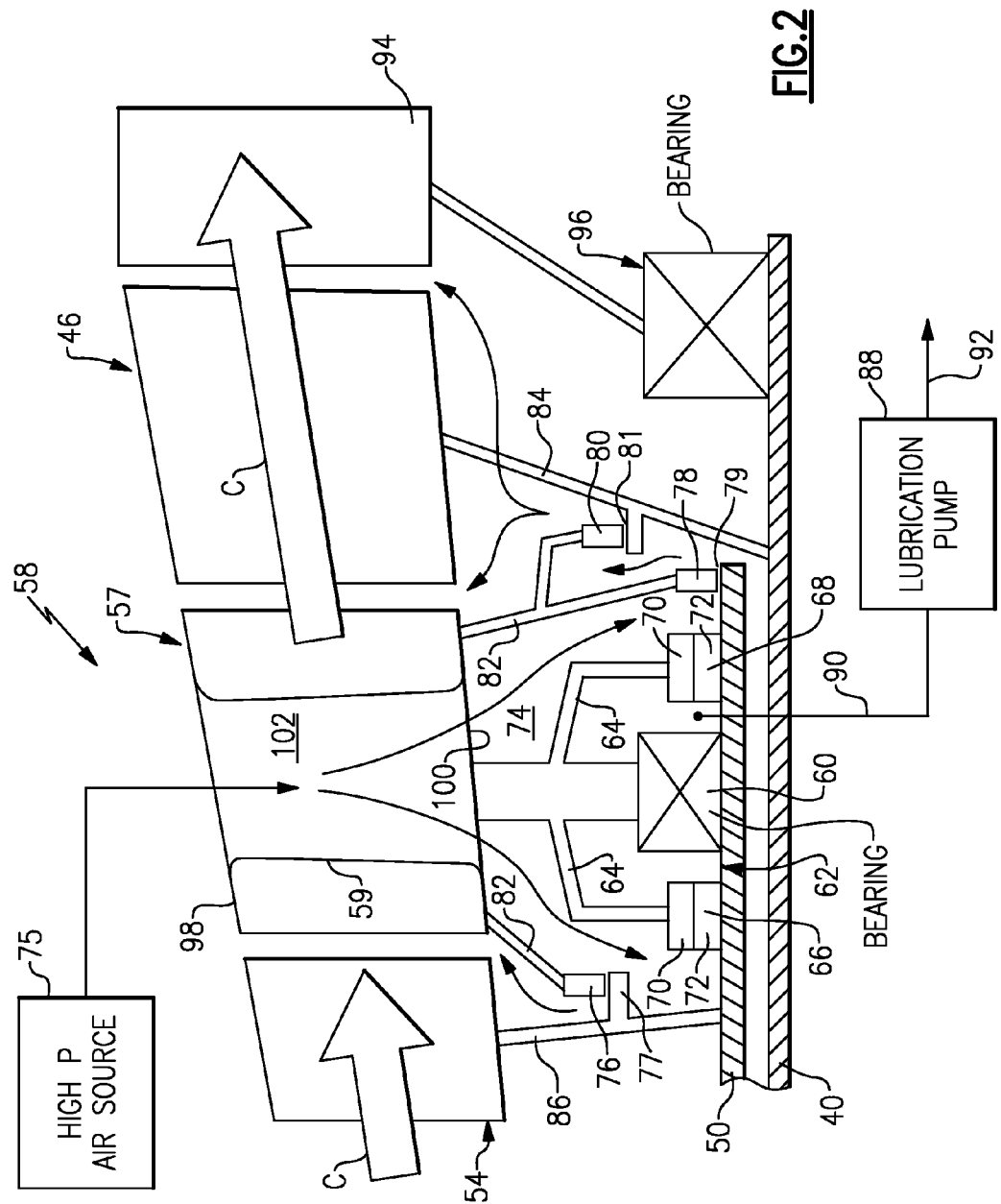
FIG. 2 schematically depicts a mid-turbine frame buffer system for the gas turbine engine illustrated in FIG. 1.

A buffer system 58 is schematically illustrated in FIG. 2. A bearing 60 is structurally supported by the mid-turbine frame 57 and supports the outer shaft 50 for rotation. The bearing may be, for example, a roller bearing a ball bearing or other type of bearing. The bearing 60 is arranged within a bearing compartment 62, which provides an enclosure for retaining lubrication for the bearing. This enclosure is provided, for example, by walls 64 that support first and second contact seals 66, 68 arranged on either side of the bearing 60. Each of the first and second contact seals 66, 68 includes first and second members 70, 72 that are in engagement with one another such that no gaps are provided between the first and second members 70, 72. At least one of the first and second members 70, 72 is constructed from a carbon material. The use of high pressure ratio face carbon seals reduces airflow into the oil compartment (as compared to conventional buffer systems), thereby eliminating the need for a conventional breather air tube.

A lubrication pump 88 is fluidly connected to the bearing compartment 62 by a scavenge line 90. Any air entering the bearing compartment 62 is exhausted through a vent 92. The lubrication pump 88 has sufficient capacity to evacuate any small amount of leakage past the first and second contact seals 66, 68 into the bearing compartment 62.

The bearing compartment 62 is enclosed within an air compartment 74. A pressurized air source 75 is fluidly coupled to the air compartment 74. "Pressurized" air is air that is provided by, e.g., the high pressure compressor 52. The mid-turbine frame 57 includes outer and inner areas 98, 100 arranged on opposing sides of the mid-turbine frame 57. A passage 102 fluidly interconnects the inner and outer areas 98, 100 to one another. In one example, the passage 102 is provided by the mid-turbine frame airfoil 59.

The air compartment 74 is provided, for example, by walls 82 that support first, second and third air seals 76, 78, 80. The first, second and third air seals 76, 78, 80 respectively cooperate with first, second and third surfaces 77, 79, 81. The first surface 77 is provided by a high pressure rotor 86. The second surface 79 is provided by the outer shaft 50. The third surface 81 is provided by a low pressure rotor 84. The air seals are provided, for example, by one or more labyrinth/knife-edge seals and/or brush seals. In the example illustrated in FIG. 2, the first seal 76 is a labyrinth seal, and the second and third air seals 78, 80 are brush seals. Air seals typically are not air tight in that they may provide small gaps. Air seals are typically designed to inhibit leakage by creating a tortuous path through which the air must pass. Any air leakage past the first, second and third air seals 76, 78, 80 vents to the low and high pressure turbines 46, 54, as depicted by the arrows in FIG. 2, which provide multiple air sinks.

In light of the foregoing design, the high pressure buffer system surrounding the bearing compartment 62 can vent directly into the turbo machinery primary core flowpath C at the mid turbine frame 57. Since the buffer air can vent directly into the core flowpath C, the number and diameter of the high pressure ratio air seals is reduced as compared to conventional turbine engines and, therefore, far less buffer airflow bypassing the turbo machinery is required. The energy in the buffer air entering the core flowpath C is captured in the downstream turbo machinery, thereby improving engine performance. In contrast, in conventional engines, the low buffer pressure systems therein must vent a larger mass flow of buffer air to a lower pressure sink in the core flowpath C downstream from turbo machinery, thereby losing the associated energy of this air and, correspondingly, negatively impacting engine efficiency.

A turbine engine case 94 supports another bearing 96, which rotationally supports the inner shaft 40 at a location aft of the bearing 60.

Although an example embodiment has been disclosed, a worker of ordinary skill in this art would recognize that certain modifications would come within the scope of the claims. For that reason, the following claims should be studied to determine their true scope and content.

What is claimed is:

1. A method of providing pressurized air to a buffer system for a gas turbine engine with an outer shaft arranged about an inner shaft, a high pressure compressor mounted to the outer shaft, and a low pressure compressor mounted to the inner shaft, the method comprising steps of:
    sealing a bearing compartment comprising a plurality of bearings supporting the outer shaft, with two or more seals; coupling one seal of the two or more seals to the outer shaft and another seal of the two or more seals to the inner shaft;
    surrounding the bearing compartment with an air compartment, wherein the bearing compartment is provided between low and high pressure turbines respectively mounted to the inner and outer shafts; and
    supplying pressurized air from the high pressure compressor to the air compartment.

2. The method according to claim 1, wherein the two or more seals comprise contact seals that include a carbon material.

3. The method according to claim 1, wherein the two or more seals comprise contact seals and two or more air seals, and wherein at least one of the air seals is at least one of a labyrinth seal and a brush seal.

4. The method according to claim 1, comprising a step of providing a mid-turbine frame supporting the outer shaft by the plurality of bearings, and surrounding the bearing compartment with the air compartment includes the air compartment and the bearing compartment arranged radially inward of the mid-turbine frame, the bearing compartment including a seal assembly provided adjacent the bearing and separating the bearing compartment from the air compartment, the air compartment including two or more air seals, and the applying step includes an air source fluidly connected to the air compartment and configured to provide pressurized air to the seal assembly in the air compartment to buffer the bearing compartment.

5. The method according to claim 4, wherein at least one bearing of the plurality of bearings is a roller bearing.

6. The method according to claim 4, wherein the step of providing the mid-turbine frame includes the high and low pressure turbines respectively mounted to the outer and inner shafts, the mid-turbine frame arranged axially between the high and low pressure turbines.

7. The method according to claim 4, wherein the step of providing the mid-turbine frame includes a lubrication pump fluidly connected to the bearing compartment by a scavenge line.

8. The method according to claim 1, wherein the two or more seals comprises first and second contact seals, wherein each of the first and second contact seals has first and second members in engagement with one another, and wherein at least one of the first and second members is constructed from a carbon material.

9. The method according to claim 8, wherein the two or more seals include at least one of a labyrinth seal and a brush seal.

10. The method according to claim 1, comprising a fan interconnected to the inner shaft via a geared architecture.

\* \* \* \* \*